(12) United States Patent
Kawasumi et al.

(10) Patent No.: US 8,779,017 B2
(45) Date of Patent: Jul. 15, 2014

(54) FOAM AND PRODUCTION METHOD OF THE SAME

(75) Inventors: Tamio Kawasumi, Chiba (JP); Haruo Inoue, Zushi (JP); Michio Eriguchi, Chiba (JP); Masaki Misumi, Yokohama (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 287 days.

(21) Appl. No.: 12/617,443

(22) Filed: Nov. 12, 2009

(65) Prior Publication Data
US 2010/0144912 A1  Jun. 10, 2010

(30) Foreign Application Priority Data

Nov. 14, 2008  (JP) ................. 2008-292327

(51) Int. Cl.
| | | |
|---|---|---|
| C08J 9/00 | (2006.01) | |
| C08J 9/12 | (2006.01) | |
| B29C 44/00 | (2006.01) | |
| B29C 44/28 | (2006.01) | |
| B29C 44/22 | (2006.01) | |
| B29C 44/34 | (2006.01) | |

(52) U.S. Cl.
CPC ............ C08J 9/122 (2013.01); C08J 9/0061 (2013.01); *C08J 2201/03* (2013.01); *C08J 2203/08* (2013.01); B29C 44/22 (2013.01); B29C 44/28 (2013.01); B29C 44/3446 (2013.01); B29C 44/3442 (2013.01)
USPC .................. 521/81; 521/80; 521/92; 521/97; 264/50

(58) Field of Classification Search
CPC ....... C08J 9/122; C08J 9/0061; C08J 2201/03; C08J 2203/08; B29C 44/3446; B29C 44/3442; B29C 44/22; B29C 44/28
USPC .................. 521/80, 92, 97; 264/50
See application file for complete search history.

(56) References Cited

U.S. PATENT DOCUMENTS

| | | | |
|---|---|---|---|
| 4,473,665 A | | 9/1984 | Martini-Vvedensky et al. |
| 5,158,986 A | | 10/1992 | Cha et al. |
| 6,344,493 B2 | * | 2/2002 | Koshirai et al. ............ 521/42.5 |
| 2006/0099289 A1 | * | 5/2006 | Fukumura ................... 425/191 |

FOREIGN PATENT DOCUMENTS

| | | | | |
|---|---|---|---|---|
| JP | 11-012382 A | | 1/1999 | |
| JP | 11-300814 A | | 11/1999 | |
| JP | 2002-069223 | * | 3/2002 | ............... C08J 9/12 |
| JP | 2002-069223 A | | 3/2002 | |
| JP | 2003-049018 A | | 2/2003 | |
| JP | 2003-089727 A | | 3/2003 | |
| JP | 3555986 | | 5/2004 | |
| JP | 2006-045259 A | | 2/2006 | |
| JP | 2003-121616 A | | 4/2006 | |
| JP | 2006-095944 A | | 4/2006 | |
| JP | 2006-146120 A | | 6/2006 | |

OTHER PUBLICATIONS

Defintion of Die from Hawley's Condensed Chemical Dictionary. 14th Edition. 2002. John Wiley and Sons.*
Revised Edition of Polymer Science and Engineering vol. 4, "Composites, Fabrication to Die Design," 1986, John Wiley and Sons, pp. 816-817 and 828-829.*
Definition of "ethylene-propylene copolymer" from Encyclopedia Britannica. 2013.*
TOPAS 9903-10 Data Sheet. Topas Advanced Polymers, Inc. 2014.*

* cited by examiner

Primary Examiner — Kara Boyle
(74) Attorney, Agent, or Firm — Buchanan Ingersoll & Rooney PC (57) ABSTRACT

A resin foam having fine foam cells is provided at low cost. A method of producing the foam includes preparing a molten resin composition and continuous extrusion foaming of the molten resin composition. The molten resin composition is prepared by melting a resin mixture of resins (A) and (B) by dissolving a foaming agent into the resin mixture. Resins (A) and (B) respectively have appropriately selected glass transition temperatures and resin (B) particles of appropriate diameter are dispersed in resin (A).

7 Claims, 3 Drawing Sheets

FIG.1

TABLE 1

| | | EXAMPLE 1 | EXAMPLE 2 | EXAMPLE 3 | EXAMPLE 4 | EXAMPLE 5 | EXAMPLE 6 | EXAMPLE 7 | REFERENCE EXAMPLE |
|---|---|---|---|---|---|---|---|---|---|
| RESIN (PARTS BY WEIGHT) | APEL 6015T | 90 | 90 | 90 | 80 | | | 90 | 100 |
| | GPPS G590 | | | | | 90 | 80 | | |
| | PP BC-4 | 10 | 10 | 10 | 20 | | | | |
| | TAFMER P-480 | | | | | 10 | | 10 | |
| | EPT X-3012P | | | | | | 20 | | |
| DISPERSED DOMAIN DIAMETER μm | | 0.2 | 0.2 | 0.2 | 0.3 | 0.5 | 0.7 | 1.0 | — |
| Tg °C | MATRIX | 145 | 145 | 145 | 145 | 95 | 95 | 145 | 145 |
| | DOMAIN | <0 | <0 | <0 | <0 | <0 | <0 | 5 | — |
| ADDED CO$_2$ AMOUNT (PARTS BY WEIGHT) | | 10 | 10 | 10 | 10 | 10 | 10 | 10 | — |
| DICE LIP CLEARANCE mm | | 0.1 | 0.2 | 0.05 | 0.1 | 0.1 | 0.1 | 0.1 | — |
| RESIN TEMPERATURE AT DICE DISCHARGE PORT °C | | 165 | 165 | 165 | 160 | 135 | 130 | 165 | — |
| DICE PRESSURE MPa | | 28 | 20 | 30 | 26 | 27 | 25 | 22 | — |
| FOAM CELL DIAMETER μm | | 2.6 | 9.8 | 1.4 | 3.4 | 3.1 | 3.9 | 5.5 | — |
| EXPANSION RATE | | 3.4 | 12 | 2.8 | 4.2 | 2.8 | 3.2 | 8.0 | NOT FOAMED |
| FOAM SHEET THICKNESS μm | | 300 | 1000 | 200 | 400 | 280 | 390 | 800 | 500 |
| RUPTURE STRENGTH MPa | | 50 | 12 | 55 | 39 | 42 | 28 | 18 | 60 |
| SURFACE APPEARANCE | | GOOD | GOOD | GOOD | GOOD | GOOD | GOOD | GOOD | — |

FIG.2

TABLE 2

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | REFERENCE EXAMPLE |
|---|---|---|---|---|---|---|---|---|
| RESIN (PARTS BY WEIGHT) | APEL 6015T | 100 | | 90 | 90 | 90 | | 100 |
| | GPPS G590 | | 100 | | | | 90 | |
| | PP BC-4 | | | 10 | 10 | 10 | 10 | |
| | TAFMER P-480 | | | | | | | |
| | EPT X-3012P | | | | | | | |
| DISPERSED DOMAIN DIAMETER μm | | — | — | 0.2 | 4.2 | 0.2 | 0.9 | — |
| Tg °C | MATRIX | 145 | 95 | 145 | 145 | 145 | 5 | 145 |
| | DOMAIN | — | — | <0 | <0 | <0 | <0 | — |
| ADDED CO₂ AMOUNT (PARTS BY WEIGHT) | | 10 | 10 | 10 | 10 | 10 | 10 | — |
| DICE LIP CLEARANCE mm | | 0.1 | 0.1 | 0.1 | 0.1 | 0.3 | 0.1 | — |
| RESIN TEMPERATURE AT DICE DISCHARGE PORT °C | | 170 | 140 | 170 | 165 | 165 | 160 | — |
| DICE PRESSURE MPa | | 30 | 28 | 14 | 27 | 22 | 24 | — |
| FOAM CELL DIAMETER μm | | 12 | 14 | 25 | 11 | 42 | 120 | — |
| EXPANSION RATE | | 7.8 | 10 | 12 | 8.0 | 15 | 7.0 | NOT FOAMED |
| FOAM SHEET THICKNESS μm | | 790 | 980 | 1240 | 820 | 5200 | 690 | 500 |
| RUPTURE STRENGTH MPa | | 1 | 2 | 4 | 2 | 1 | 1 | 60 |
| SURFACE APPEARANCE | | GOOD | GOOD | ROUGHENED | GOOD | ROUGHENED | POOR FOAMING | — |

FIG.3

FOAM AND PRODUCTION METHOD OF THE SAME

CROSS REFERENCE TO RELATED APPLICATIONS

The disclosure of Japanese Patent Application No. 2008-292327 filed on Nov. 14, 2008 including the specification, drawings and abstract is incorporated herein by reference in its entirety.

TECHNICAL FIELD

This disclosure relates to a resin foam production method, and more specifically to a foam production method from a molten resin composition which contains two different resins by continuous extrusion, and a foam produced by the production method.

BACKGROUND ART

A resin foam refers to a low-density plastic containing a large number of interconnected pores or mutually independent pores which are uniformly distributed throughout the plastic. Pores in a foam are referred to as "foam cells." Examples of commercialized foams include polystyrene foams, ABS foams, polyethylene foams, and polypropylene foams.

Foams are used for a variety of applications, depending on the property of the resin used. For example, they can be used for cushion materials, heat insulating materials, acoustic insulating materials, packing materials, electrical insulating materials, and light reflective materials. In particular, foams containing pores or small bubbles of the order of micrometers in size are used as visible light reflecting materials, exhibiting very high light reflectivity. With the conventional foaming methods, however, foam cells grow to 100 μm or more in size; therefore, most of the conventional methods can provide only foam sheets of over 1 mm in thickness. Moreover, it is difficult with these foaming methods to provide smooth sheet surface appearance. Large foam cells particularly lead to poor light reflection characteristics; resultant foam sheets fail to reach the practical level.

In addition to foams, stretched porous films containing inorganic or organic fillers have been also used as light reflective materials. However, films containing inorganic or organic fillers produce a large amount of residues when burned.

Methods of producing foams, particularly foams with fine foam cells, can be broadly classified into three types: batch process, injection molding, and continuous extrusion.

In a batch process (see, e.g., Patent Literatures 1-8), a solid resin composition is placed in a pressure-resistant container; a foaming agent is penetrated into the solid resin composition under high pressure; and the internal pressure of the container is rapidly reduced, allowing the foaming agent dissolved in the resin composition to become oversaturated for foaming to produce a foam, or the solid resin composition in which the foaming agent is penetrated is heated for foaming after taken it out as a solid from the container. The batch process has the advantage of capable of producing a foam having fine foam cells because a resin composition in solid state foams. However, as the batch process has the problem of limited depressurization rate, gas diffuses out of the film system before foaming occurs particularly where a thin film is used. It is thus difficult with the batch process to provide thin film foams.

Injection molding is a process in which a molten resin composition containing a foaming agent is injected into a mold cavity where it cools and hardens. While injection molding is advantageous in that cooling and hardening can be readily achieved by injection into a mold cavity, it is necessary to form an unfoamed skin layer on a molded product to provide good appearance. Specifically, a skin layer of unfoaming state is formed on the mold cavity surface without letting it foam by keeping high pressure in the mold cavity when a molten resin is injected in the mold cavity, and it is necessary to decrease pressure in the mold cavity by core back methods (the operation side of the mold is backed up to increase cavity volume in the mold) promptly afterwards and let the skin layer to foam.

Continuous extrusion (see e.g., Patent Literatures 9-11) is a process in which a resin mixture is plasticized and melted by an extruder and at the same time a foaming agent is dissolved in the resin mixture under high pressure and then the molten resin mixture is continuously extruded into a sheet or film by passing through a die, whereby the internal pressure of the extruder is instantly reduced back to atmosphere pressure. A foam is obtained in the same manner as that of the above batch process—the foaming agent dissolved in the molten resin composition is made to become oversaturated to foam. Continuous extrusion has the advantages of low production costs and easy mass production. In addition, continuous extrusion is capable of instant depressurization and therefore has the advantages of, for example, being capable of increasing the number of nucleation sites from which foam cells are produced, and of easily effecting foaming before the foaming agent dissolved therein is diffused and discharged to the outside.

CITATION LIST

Patent Literature

PTL 1: U.S. Pat. No. 4,473,665
PTL 2: U.S. Pat. No. 5,158,986
PTL 3: Japanese Patent Application Publication (JP-A) No. 2006-146120
PTL 4: JP-A No. 2003-89727
PTL 5: JP-A No. 2006-95944
PTL 6: JP-A No. 2003-121616
PTL 7: JP-A No. 2003-49018
PTL 8: JP-A No. 2002-69223
PTL 9: JP-A No. 2006-45259
PTL 10: JP-A No. 11-300814
PTL 11: Japan Patent No. 3555986

SUMMARY OF INVENTION

Technical Problem

As described above, foam production methods can be broadly classified into the following: batch process, injection molding, and continuous extrusion. The batch process has the advantage of capable of foaming a solid resin composition to produce a foam having fine foam cells, but is unfit for mass production and may be disadvantageous in cost. Moreover, as the depressurization rate in the batch process is low compared to that in continuous extrusion, it is subjected to constraints of foam shape, particularly foam size or thickness, under certain circumstances.

On the other hand, since continuous extrusion achieves foaming of a resin mixture by extruding it in a molten state, it has been deemed that it is extremely difficult with continuous extrusion to control the foam cell growth and to control the production condition precisely.

In attempts to solve the above problems a number of related technologies have been suggested as to the production of foams having smaller foam cells. However, most of the suggested technologies employ batch processes in Working Examples. Heretofore, no examples have been recognized where foams having foam cells of 10 μm or less in diameter (microcellular foams) are industrialized by continuous extrusion. In fact, no technologies have been believed to be realized that achieve microcellular foams by continuous extrusion. Patent Literature 8 discloses a method of producing a foam having fine foam cells by using an extruder, but fails to describe any specific extrusion conditions used for the extruder; instead, specifics of production conditions used for batch process are described. The inventors conducted studies and established that batch process and continuous extrusion use largely different foaming conditions, and foam cell size also largely varies depending on the kind of resin used, i.e., that batch process and continuous extrusion use different conditions for micronization of foam cells.

In injection molding processes, many of the resultant articles are greater than 1 mm in thickness; such thick foamed articles tend to have large bubbles at the center due to failure of sufficient suppression of bubble growth in the thickness direction.

It is therefore an object of the present invention to easily mass-produce a foam having fine resin particles containing bubbles by continuous extrusion using an extruder.

Solution to Problem

The inventors conducted studies aiming at producing a foam having fine resin particles containing bubbles by continuous extrusion. Herein "bubble" means "foam cell." As a result, they established that such a foam can be produced by dissolving a foaming agent into a resin composition containing two or more appropriately selected resins to prepare a molten resin composition and molding it by continuous extrusion.

The present invention has been accomplished particularly by appropriately controlling the glass transition temperatures (Tg) of two or more resins (resins (A) and (B)) contained in a resin mixture; dispersion state of the resin dispersed in the molten resin composition; extrusion conditions such as die pressure and die lip clearance of an extruder; thickness of a resultant foam; and so forth.

A first aspect of the present invention relates foam production methods described below.

[1] A method of producing a foam including:
preparing a molten resin composition which contains resin (A), particulate resin (B) immiscibly dispersed in resin (A), and a foaming agent; and
producing a foam by continuous extrusion foaming of the molten resin composition,
wherein, during the continuous extrusion foaming, the foaming agent is allowed to foam in resin (B) to form particulate resin (B) which contains a bubble and has a particle diameter of 10 μm or less.

[2] The method according to [1], wherein resin (A) has a glass transition temperature of higher than 50° C., and a glass transition temperature of resin (B) is lower than the glass transition temperature of resin (A) by 50° C. or more.

[3] The method according to [1] or [2], wherein resin (A) is polystyrene resin or cyclic polyolefin resin, and resin (B) is polypropylene resin, polyethylene resin, or elastomer.

[4] The method according to any one of [1] to [3], wherein resin (B) has an average particle diameter of 1 μm or less.

[5] The method according to any one of [1] to [4], wherein the foaming agent is a supercritical physical foaming agent.

[6] The method according to any one of [1] to [5], wherein an extruder for continuous extrusion foaming of the molten resin composition has a die internal pressure of 20 MPa or higher and a die lip clearance of 0.2 mm or less.

[7] The method according to any one of [1] to [6], wherein the foam is a resin sheet or resin film which is 1 mm or less in thickness.

[8] The method according to any one of [1] to [7], wherein particulate resin (B) containing bubbles has an average diameter of 0.1 μm or more to 10 μm or less and a foam cell density of $1 \times 10^8$ cells/cm$^3$ or more to $1 \times 10^{16}$ cells/cm$^3$ or less.

A second aspect of the present invention relates to a foam described below.

[9] A sheet or film foam produced by the method according to any one of [1] to [8], wherein the foam is 10 μm or more to 1 mm or less in thickness.

Advantageous Effects of Invention

The present invention can inexpensively provide a foam having fine resin particles containing bubbles. The foam having fine foam cells is suitably used as a heat insulating sheet, low permittivity sheet, light reflecting material, etc.

DESCRIPTION OF EMBODIMENTS

1. Foam Production Method

A production method of a foam according to an embodiment of the present invention includes the steps:
1) preparing a molten resin composition which contains resin (A), particulate resin (B) immiscibly dispersed in resin (A), and a foaming agent; and
2) producing a foam by continuous extrusion foaming of the molten resin composition with an extruder.

As described above, in general, foam production methods can be broadly classified into the following: batch process, injection molding, and continuous extrusion. While it has been difficult with conventional continuous extrusion to make fine foam cells in a resultant foam, the present invention can provide a resin foam having fine foam cells by continuous extrusion using an extruder.

A resin mixture as a source of a molten resin composition contains resins (A) and (B). Preferably, resins (A) and (B) are mutually immiscible resins. When resins (A) and (B) are mutually immiscible, they can assume a so-called "sea-island structure" in which resin (B) particles are dispersed in the matrix of resin (A).

Resin (B) particles can be dispersed in resin (A) by appropriately selecting mutually immiscible resins (A) and (B) while considering their glass transition temperature and viscosity which will be described later. Furthermore, it is preferable to employ a twin screw extruder for kneading so that resin (B) can be dispersed in resin (A) in the form of fine particles. A recommended twin screw extruder is an intermeshing co-rotating twin screw extruder, which can achieve more powerful kneading. It is more preferable to optimize extrusion temperature for higher shearing force. If resin (B) is hard to be finely dispersed in resin (A) even with such a twin extruder, fine dispersing can be enabled by adding known compatibilizers. It is advantageous to make dispersed resin (B) particles fine as much as possible; more specifically, the average of the major diameter of resin (B) particles is preferably 1 µm or less.

Resins (A) and (B) have different glass transition temperatures. Firstly, resin (A) preferably has a glass transition temperature of higher than 50° C. More preferably, the glass transition temperature of resin (A) is higher than 50° C. and 250° C. or less, further preferably 70° C. or more to 250° C. or less. When the glass transition temperature of resin (A) is too low, it results in failure to suppress the growth of bubbles in resin (B) upon foaming of the molten resin composition, resulting in the generation of too large foam cells. The mechanism of suppressing the bubble growth will be described later. The glass transition temperature (Tg) of resin (A) can also be adjusted by, for example, crosslinking of resin (A), other than by selecting resins having glass transition temperatures falling within the above ranges.

The glass transition temperature (Tg) of resin (B) is preferably lower than that of resin (A), more preferably lower than that of resin (A) by 50° C. or more. Further preferably, the glass transition temperature (Tg) of resin (B) is lower than that of resin (A) by 50° C. or more to 300° C. or less, most preferably by 100° C. or more to 250° C. or less. By combining resins (A) and (B) having the above glass transition temperatures (Tg), foaming of the foaming agent is favored in resin (B) over resin (A) upon extrusion foaming, generating resin (B) particles which contain bubbles (the details will be described later). When the glass transition temperature difference between resins (A) and (B) is small, the viscosity difference between resins (A) and (B) upon extrusion foaming becomes small. Thus, it becomes difficult to cause foaming selectively in resin (B).

Preferred examples of resin (A) include polystyrene resins (e.g., polystyrene, and acrylonitrile-styrene copolymer), cyclic polyolefins, polyvinyl chloride, polyvinylidene chloride, polycarbonate, polysulfone, polyethersulfone, polyarylate, polyether ether ketone, methyl polymethacrylate, polyoxymethylene, saturated polyester resins (e.g., polyethylene terephthalate, polybutylene terephthalate, polyethylene naphthalate, and polybutylene naphthalate), polylactates, polyamides, and polyimides. In particular, styrene resins and cyclic polyolefin resins are preferably used.

Resin (B) is preferably a resin whose glass transition temperature (Tg) is not higher than room temperature; examples thereof include ethylene-propylene rubbers, propylene-butene rubbers, hydrogenated styrene-butadiene block copolymers, hydrogenated styrene-butadiene-styrene triblock copolymers, hydrogenated styrene-isoprene-styrene triblock copolymers, ethylene-ethyl acrylate copolymers, ethylene-vinyl acetate copolymers, elastomers such as polybutenes, polypropylene resins, and polyethylene resins.

Resins (A) and (B) are not required to be different resins. Namely, they may be contained as copolymer units in one kind of resin. For example, ABS resin is one kind of resin which is a copolymer of acrylonitrile, butadiene and styrene, exhibiting a sea-island structure in which butadiene rubber domains are dispersed in a matrix of acrylonitrile-styrene copolymer. In this case, the butadiene rubber domain corresponds to resin (B), and the acrylonitrile-styrene copolymer corresponds to resin (A).

Preferably, resin (A) inherently has a high fine-cell formation capability. Fine-cell formation capability is a capability of forming small foam cells when a foaming agent added in the resin is caused to foam. Resins with high fine-cell formation capability are typically resins with strong tendency of "strain-induced hardening" which is evaluated by melt tension, elongational viscosity, etc. Several measures are taken to enhance the strain-induced hardening of resin. For example, during a polymerization stage, the resin molecular weight distribution may be broadened; the resin molecular weight distribution may be adjusted to form two peaks; or the resin may be cross-linked by the addition of cross-linking agents. "Strain-induced hardening" is a measure, expressed in terms of the viscosity behavior of molten resin, of the capability of reducing the foam cell size by preventing, upon resin foaming under certain conditions, such phenomena as expansion ratio reduction due to foam cell burst, foam cell size increase due to aggregation, and supersizing of individual foam cells. In general, resins with strong tendency of strain-induced hardening often have high fine-cell formation capability. More specifically, strain-induced hardening is a measure indicating how much a molten resin extruded from a die can control foam cell growth. Namely, resins with strong tendency of strain-induced hardening are said to potentially have high fine-cell formation capability.

Preferably, resins (A) and (B) have different viscosities. When resin (B) has a lower viscosity than resin (A), the foaming agent is prone to foam in resin (B), facilitating formation of resin (B) particles containing bubbles.

Preferably, resins (A) and (B) each have a melt flow rate (MFR) of 0.1-70 (g/10 min.) at 190° C. Melt flow rate (MFR) is measured in accordance with ASTM D1238. When the melt flow rates of resins (A) and (B) according to an embodiment of the present invention are compared at the same temperature and under the same load, it is preferable that the relationship (resin (B) MFR>resin (A) MFR) be established.

From the above resins, those which are mutually immiscible and in which glass transition temperature difference is 50° C. or more are selected as a combination of resins (A) and (B). In addition, resins (A) and (B) each may contain different resins.

Preferably, resin (A) is relatively higher in proportion than resin (B) in the molten resin composition to be extrusion foamed, for dispersing resin (B) particles in resin (A). More specifically, the ratio of resin (B) is preferably 5 wt % or more to 30 wt % or less, more preferably 10 wt % or more to 30 wt % or less, based on the total amount of resins (A) and (B).

In a molten resin composition to be extrusion foamed, resin (B) is immiscibly dispersed in resin (A). Preferably, resin (B) is finely dispersed in resin (A). Specifically, resin (B) is dispersed in resin (A) in the form of particles which are 1 µm or less in diameter. If resin (B) is finely dispersed, foam cells formed by extrusion foaming can be made fine, e.g., foam cell diameter can be reduced to 10 µm or less (microcellular size).

As described above, it is preferable that resin (B) particles dispersed in resin (A) have an average particle diameter of 1 µm or less. The dispersion state of resin (B) particles in a resin mixture for measurement of its average particle diameter is observed using a measurement sample prepared as follows: a resin mixture sample is cut to expose surfaces; domains formed of resin (B) particles are dyed with ruthenium tetroxide ($RuO_4$); and the resin mixture sample is cut into a thin piece and reinforced with carbon. The cut surface of the obtained measurement sample is then observed with a transmission electron microscope (H-7000, Hitachi, Ltd.) to calculate an average of the major diameters of at least 30 domains formed of resin (B) particles. The average value is preferably defined as the average particle diameter of resin (B).

Heating during extrusion foaming causes foaming of a foaming agent in resin (B) particles, trapping bubbles therein. Thus, when resin (B) particles dispersed in a molten resin composition have large particle diameters, they become too large in size when bubbles are trapped therein. Namely, it becomes difficult to set the foam cell diameter to 10 μm or less in a resultant foam. Because bubbles contained in resin (B) particles become foam cells, in order to form fine foam cells, it is preferable to reduce the particle diameter of resin (B) dispersed in a molten resin composition.

Dispersing of particulate resin (B) in resin (A) is preferably accomplished by, for example, melt-kneading of a mixture of resins (A) and (B) by a twin screw extruder. By adjusting the melt-kneading condition, resin (B) can be made fine (e.g., resin (B) can be formed into particles whose diameter is 1 μm or less). For example, the resin mixture may be strongly kneaded with a twin screw extruder. Moreover, formation of fine resin (B) particles is facilitated by the addition of compatibilizers. Examples thereof include styrene-ethylene-butylene-styrene block copolymers (SEBS). It is, of course, effective for micronization of resin (B) particles to select appropriate resins (A) and (B) for adjustment of their compatibilization index.

A foaming agent is additionally added to, preferably dissolved in, a resin mixture which contains resins (A) and (B) and another optional resin (e.g., compatibilizer). The foaming agent is preferably a physical foaming agent rather than a so-called chemical foaming agent such as sodium hydrogen carbonate or diazoaminobenzene. Examples of the physical foaming agent include carbon dioxide and nitrogen; it is further preferably a supercritical physical foaming agent. In either case, it is preferable to select a foaming agent which has a high solubility in resin (B) contained in the resin mixture.

The amount of a foaming agent added in a molten resin mixture varies depending on the kind of the foaming agent, but is preferably 0.1 wt % or more to 50 wt % or less based on the amount of the resin mixture containing resins (A) and (B) in the case where carbon dioxide is used as the foaming agent. By increasing the foaming agent concentration in the molten resin composition, it becomes possible to make fine foam cells in the resultant foam and to increase foam cell density.

Dissolution of a foaming agent is preferably conducted under pressure. The pressure under which a foaming agent is dissolved in a molten resin mixture containing resins (A) and (B) and another optional resin is preferably about 8 MPa or more to 40 MPa or less. The temperature at which a foaming agent is dissolved is preferably about 150° C. or more to 300° C. or less (e.g., around 250° C.).

The foaming agent may have a higher solubility in resin (A) than in resin (B) and vice versa. Preferably, the foaming agent has a higher solubility in resin (B) than in resin (A) so as to facilitate selective foaming of resin (B). It should be noted that whether resin foaming occurs depends on the viscosity of the molten resin rather than on the foaming agent solubility in the resins. More specifically, even when the foaming agent has a higher solubility in resin (B) than in resin (A), resin (B) does not foam if resin (B) has a higher viscosity than resin (A) as measured upon extrusion foaming. Conversely, if resin (B) has a lower viscosity than resin (A), resin (B) foams. Accordingly, it is preferable that resin (A) have a higher viscosity than resin (B) as measured upon extrusion foaming. The viscosity of resin (A) is preferably 1,000-100,000 Pa·S and the viscosity of resin (B) is preferably 100-10,000 Pa·s and is preferably lower than that of resin (A), as measured at die temperature of 80-240° C. upon extrusion foaming. Resin viscosity can be measured with a capillary melt viscometer or any known viscoelasticity measurement instrument.

A molten resin composition in which a foaming agent is dissolved is extruded from a die and discharged in a relatively vacuumed atmosphere. When the molten resin composition is extruded from the die, the foaming agent dissolved in the molten resin composition instantly becomes oversaturated and foaming immediately occurs to generate foam cells. As a result of resin hardening, the foam cells are fixed. In this way, a foam is produced.

As described above, the molten resin composition contains resin (A) and resin (B) particles dispersed in resin (A), wherein the glass transition temperature of resin (A) is higher than 50° C., and the glass transition temperature of resin (B) is lower than that of resin (A) by 50° C. or more. This prevents foaming in resin (A) when the molten resin composition is allowed to foam; foaming can be effected selectively in resin (B).

Although the foaming agent exists both in resin (A) and resin (B) in the molten resin composition, the foaming agent in resin (B) selectively foams during continuous extrusion foaming. It is assumed that when the amount of foaming agent dissolved in resin (B) changes due to foaming, a part of the foaming agent present in resin (A) migrates into resin (B) and then foams therein.

In this way foam cells of a foam are selectively formed in particles (domains) of resin (B), and these resin (B) particles are covered by resin (A). This prevents supersizing of foam cells; the foam assumes a structure in which bubbles are trapped in resin (B).

Namely, it is assumed that since resin (B) particles are surrounded by resin (A)—a resin with a high-glass transition temperature, resin (A) suppresses the growth of cell foams when they are generated by foaming of the foaming agent contained in resin (B) particles. In this way fine resin (B) particles containing foam cells are formed.

The thickness of a foam to be produced is preferably set to 1 mm or less. When the foam thickness is too large, it results in failure to uniformly cool the resin extruded from the die, which in turn makes it difficult to make uniform the size and distribution of dispersed foam cells. More specifically, it becomes difficult to produce a microcellular foam in which foam cells of 10 μm or less in diameter (cell diameter) are uniformly dispersed.

The shape and foam cell structure of a foam to be produced can also be adjusted by appropriately selecting the die type. For example, when a sheet foam with a thickness of 1 mm or less is to be manufactured, it is only necessary to employ a circular die, with the die lip clearance being set to 0.005 mm or more to 0.2 mm or less, preferably 0.01 mm or more to 0.2 mm or less. When the die lip clearance is less than 0.005 mm, a sheet foam with a uniform thickness cannot be obtained. Moreover, the die internal pressure can be controlled by adjusting the die lip clearance. Herein, "die lip clearance" refers to a clearance of a discharge port of a die.

The die temperature is preferably set to around 80-240° C., and the die internal pressure is preferably set to 20 MPa or higher, more preferably 20 MPa or more to 50 MPa or less. From an equipment perspective, it is difficult to set the die internal pressure to higher than 50 MPa. By increasing either die temperature or die internal pressure, foam cells in the resultant foam may be made fine, and foam cell density may be enhanced as well.

By continuous extrusion foaming (described later) of a molten resin composition which contains resins (A) and (B) and foaming agent as a resin material, it is possible to produce a foam containing fine foam cells. The mechanism by which such a foam is obtained is not specifically limited; a possible exemplary mechanism will be described below.

By way of example, a possible mechanism where a cyclic polyolefin is used as resin (A) and an ethylene-propylene rubber is used as resin (B) is described. Firstly, it should be noted that cyclic polyolefins for use as resin (A) are resins which inherently show good foamability and thus can easily form fine foam cells. This is considered to be due to their strong tendency of strain-induced hardening as they have high glass transition temperatures (around 150° C.) thus can rapidly change from molten state to solid state upon foaming.

Ethylene-propylene rubbers for use as resin (B), on the other hand, have very low glass transition temperatures. For this reason, ethylene-propylene rubbers generally show poor foamability even though the solubility of a foaming agent in ethylene-propylene rubber is relatively high. This is due to their very weak tendency of strain-induced hardening which raises such problems as foam cell burst during foaming, aggregation of foam cells, and failure to increase expansion ratio due to high likelihood of escape of foaming agent from the resin.

Nevertheless, it is assumed that when an ethylene-propylene rubber is dispersed as a domain in a cyclic polyolefin, the cyclic polyolefin can suppress the extreme growth of foam cells generated in the ethylene-propylene rubber.

Thus, a more preferable foaming condition used in a foam production method according to an embodiment of the present invention is such a condition where foaming hardly occurs if only resin (A) (cyclic polyolefin in this case) is used as a resin component in a molten resin composition and where foaming sufficiently occurs if only resin (B) (ethylene-propylene rubber in this case) is used as a resin component in the molten resin composition. It is assumed that under such a foaming condition the force that makes the ethylene-propylene rubber instantly foam almost balances the foam suppressing force of the cyclic polyolefin, resulting in the formation of fine foam cells.

As described above, a foam production method according to an embodiment of the present invention by means of continuous extrusion includes the steps of 1) preparing a resin mixture which contains resins (A) and (B); 2) injecting a foaming agent into the resin mixture which has been melt; and 3) discharging the molten resin composition containing the foaming agent through a die. A series of the above steps other than preparation of the resin mixture is preferably conducted in an extruder equipped with a die.

The extruder is available in a variety types, including single screw extruders, twin screw extruders, and tandem extruders in which multiple extruders are connected in series, and can be selected from commercially available extruders.

A resin mixture which contains resins (A) and (B) is fed in a resin feed unit of an extruder, where the fed resin mixture is melted by the rotation of the screw attached to the heated cylinder of the extruder. The extruder temperature may be set such that the molten resin mixture has a melt viscosity at which it can undergo extrusion; it is preferably 80° C. or more to 260° C. or less. An optimal screw may be employed depending on the property of the foaming agent to be added. The screw shape is not specifically limited as long as the resin can be melted at a site where a foaming agent such as carbon dioxide or nitrogen is supplied.

A foaming agent is injected and dissolved in the molten resin mixture. It is preferable that the foaming agent be completely dissolved in the molten resin composition. If undissolved residue remains, there is concern that micronization of foam cells is suppressed due to the formation of large bubbles in the resultant foam, the undissolved residue gushes from the die, and so forth.

The foaming agent is preferably injected in the molten resin mixture as a supercritical fluid. Alternatively, the foam gas injected in the molten resin mixture is preferably made supercritical before a filtration step. A supercritical fluid refers to a fluid of a certain substance at a temperature and pressure above its critical point, exhibiting physical properties intermediate between those of gases and liquids. Foaming agents in supercritical fluid state have higher solubility in the molten resin mixture than they are in typical gas state.

The molten resin composition in which a foaming agent is dissolved may be optionally filtrated through a filter to remove foreign substances and modified polymers (filtration step).

The molten resin composition in which a foaming agent is dissolved is guided to a die by passing through heated flow paths (e.g., barrel and connecting pipe). In order to supply the molten resin composition to the die constantly, a gear pump may be provided. The polymer transported to the die is then discharged after having been widened to a required width in the die.

The pressure in the extruder is maintained at a high level until the molten resin composition reaches right in front of the die unit so as to avoid foaming of the foaming agent in the molten resin composition. If the extruder pressure decreases before the molten resin composition reaches right in front of the die unit, foaming of the foaming agent occurs in the die and thereby foam cells grow and become large, a undesirable phenomenon in view of formation of fine foam cells. It is therefore preferable to provide a pressure adjusting valve right in front of the die unit in order to maintain the pressure applied to the molten resin composition in the extruder at a high level until it reaches right in front of the die unit.

The molten resin composition in which a foaming agent is dissolved in an extruder is molded by being discharged from the die, and at the same time the dissolved foaming agent foams. It is essential to harden the molten resin composition by rapid cooling immediately after being discharged. Otherwise, foam cells remarkably grow and formation of fine foam cells will fail. In order to achieve an appropriate foaming level of foaming agent in the die, pressure loss in the die is preferably as small as possible, and in addition the die internal pressure is preferably set to 20 MPa or higher.

A foam according to an embodiment of the present invention can be produced with any desired extruder, but preferably with a tandem extruder in which two or more extruders are connected in series. With a tandem extruder it is easy to ensure sufficient time for the foaming agent to be dissolved in the molten resin mixture, and to reduce resin temperature with approaching the die in the second extruder. In general, the viscosity of the molten resin composition decreases with increasing the amount of the foaming agent dissolved in the molten resin mixture. By decreasing the resin temperature with approaching the die, it is possible to suppress viscosity reduction of the molten resin composition, i.e., to maintain die pressure.

When a tandem extruder is employed, it is preferable to provide a ring and seal mechanism for preventing backflow of a foaming agent (e.g., carbon dioxide) between the resin feed unit and the foaming agent (carbon dioxide) feeding position. Since the pressure is lower at the resin feed unit than at the foaming agent feeding position, backflow of foaming agent can be prevented by the seal mechanism.

Additionally, a foam molded into a sheet or film by being discharged from the die may be either uniaxially or biaxially stretched. Although the foam discharged from the die is substantially amorphous and non-oriented, orientation can be imparted by stretching. Stretching can be accomplished by successive biaxial stretching, tubular simultaneous biaxial stretching or tenter simultaneous biaxial stretching, which are known stretching technologies. Moreover, when the foam extruded from the circular die is recovered by passing through between rotating mandrels, lateral stretching is effected by setting the mandrel diameter larger than the diameter of the die discharge port, and vertical stretching is virtually effected by increasing the recovery speed.

The foam molded in a sheet or film by being discharged from the die may be optionally pressed (surface-pressed), so that surface conditions such as surface roughness of the sheet-shaped foam can be adjusted.

2. Foam

A foam according to an embodiment of the present invention is a foam produced by the above method, which is a foam of a resin mixture containing resins (A) and (B). In the foam resin (B) is dispersed in resin (A) in the form of particles which are 10 μm or less in diameter and contain bubbles. Herein, small voids or small bubbles in the foam are referred to as "foam cells."

As described above, resins (A) and (B) are mutually immiscible resins. In this case, they can easily assume a sea-island structure. By increasing the resin (A)/resin (B) ratio, resin (B) particles can be dispersed in resin (A).

As described above, resin (A) preferably has a glass transition temperature (Tg) of higher than 50° C., and resin (B) preferably has a glass transition temperature (Tg) that is lower than that of resin (A) by 50° C. or more. By combining resins (A) and (B) having such glass transition temperatures (Tg), the foaming agent in resin (B) selectively foams, thereby forming resin (B) particles containing bubbles.

Foam cells of a foam according to an embodiment of the present invention exist in particulate resin (B). Resin (B) particles containing foam cells are preferably fine particles. As used herein, "fine" means that an average of the major diameters of resin (B) particles containing foam cells is 10 μm or less, preferably 5 μm or less, more preferably 4 μm or less. By making fine foam cell-containing resin (B) particles, it is possible to produce a foam having enhanced light reflectivity and light diffusion, which can be used as a light reflective material.

The average of the major diameters of foam cell-containing resin (B) particles in a foam can be measured as follows: A section of a film or sheet foam cut in the traverse direction is observed with a scanning electron microscope (JSM-6380, JEOL Ltd.) at a magnification of 2,000×; and an average value of the major diameters of at least 30 randomly selected foam cells is calculated.

As foam cells exist in resin (B), they are surrounded by films of resin (B). Namely, a foam according to an embodiment of the present invention has a three-layer structure consisting of bubbles, resin (B), and resin (A). Thus, the foam according to an embodiment of the present invention offers improved mechanical properties, particularly improved rupture strength, over foams in which foam cells are simply dispersed in resin matrix.

The reason for this is considered to be that resin (B) particles containing bubbles are small in size (10 μm or less in diameter) and that bubbles—which are disadvantageous in normal situations from the viewpoint mechanical properties—are surrounded by relatively soft resin (B).

Foam cell density in a foam (cell density) is preferably $1 \times 10^8$ cells/cm$^3$ or more, more preferably $1 \times 10^{10}$ cells/cm$^3$ or more. Although the upper limit is not restricted, cell density is generally not higher than $1 \times 10^{16}$ cells/cm$^3$. Cell density is the number of foam cells per unit volume of a foam. A plurality of foam cells may be contained in one resin (B) particle. Thus, the number of foam cells does not necessarily equal to the number of resin (B) particles; it is the actual foam cell count in a foam. By increasing foam cell density, light reflectivity, light diffusion rate, etc., of a foam are enhanced. Foam cell density can be found from the following equation using expansion ratio and cell diameter.

$$\text{Foam cell density} = (3/4) \times (1/3.14) \times (2/\text{cell diameter})^3 \times (1 - 1/\text{expansion ratio}) \times 10^{12}$$

In the above equation, cell diameter may be an average major diameter of foam cells. The average major diameter of foam cells can be measured in the same manner as the average major diameter of foam cell-containing resin (B) particles. Expansion ratio may be defined as $T_0/T_s$ where $T_0$ is the density of molten resin composition before foamed and $T_s$ is the density of resultant foam, which densities are measured with Mirage-Electronic Densimeter MD-200S.

The shape of a foam according to an embodiment of the present invention is not specifically limited; however, the foam is preferably 10 μm or more to 1 mm or less in thickness, more preferably 20 μm or more to 0.6 mm or less in thickness, from the viewpoint of stably forming foam cells according to the present invention and reducing the foam cell size. The foam thickness can be directly measured by observing a section of a thin foam, cut in traverse direction, with a scanning electron microscope (JSM-6380, JEOL Ltd.) at a magnification of 100×.

Foam cells of a foam according to an embodiment of the present invention are formed in resin (B) particles as described above. This is because both the glass transition temperature of resin (A) and glass transition temperature of resin (B), which is dispersed in resin (A) as fine particles, are appropriately selected.

A foam according to an embodiment of the present invention can be used in any desired application, e.g., as a cushion material, heat insulating material, acoustic insulating material, packing material, electrical insulating material, or light reflective material. The foam is particularly suitable for use as a light reflective material because its foam cells are made fine and foam cell density is increased. An increased number of interfaces between resin layers and air layers advantageously increases light reflectivity, enhancing light diffusion performance.

EXAMPLES

Hereinafter, the present invention will be described in detail with reference to Examples, which however shall not be construed as limiting the scope of the invention thereto.

Figure 1:
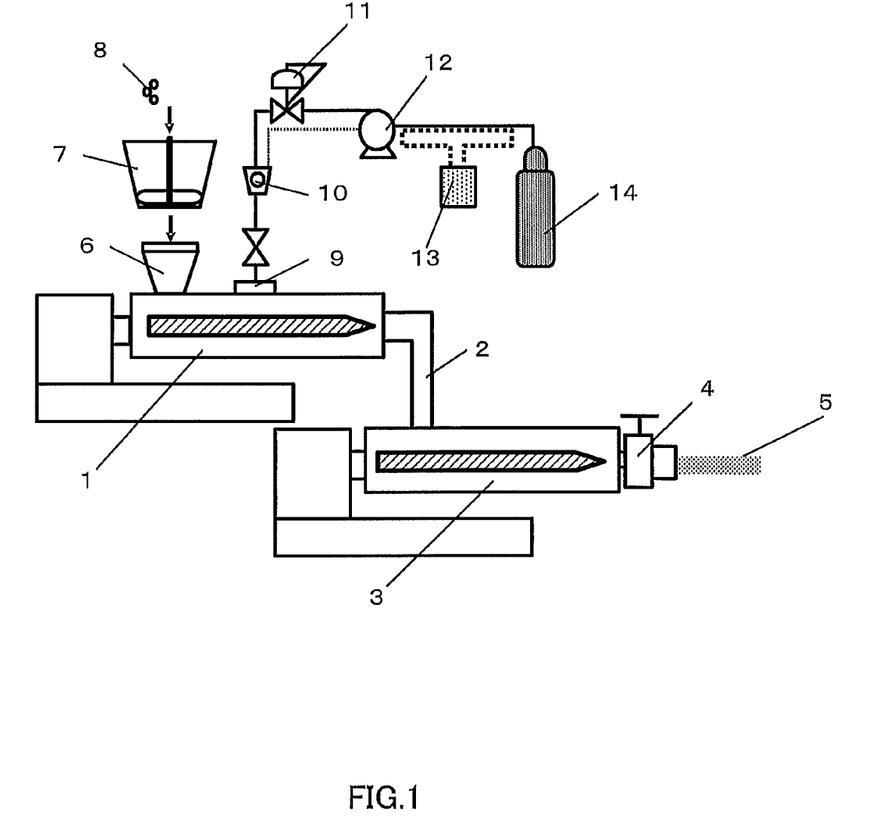
FIG. 1 illustrates a tandem extruder.

As a foam production apparatus, a tandem extruder shown in FIG. 1 was prepared. The tandem extruder includes first extruder 1, second extruder 3, and connecting pipe 2 for connecting the first and second extruders together. Pressure-controlled circular die 4 is attached to the discharge port of second extruder 3. Foam 5 is discharged from die 4. The diameter of pressure-controlled circular die 4 was set to 800 mm.

First extruder 1 is provided with hopper 6 through which resin 8 mixed in mixer 7 is fed. First extruder 1 is also provided with foaming agent feed unit 9 through which a foaming agent contained in foaming agent tank 14 is fed in first extruder 1. Refrigerant circulator 13, foaming agent metering pump 12, pressure valve 11, and direct mass flow meter 10 are sequentially arranged along the route from foaming agent tank 14 to foaming agent feed unit 9.

First extruder 1 is a singe screw extruder (L/D=30) and the screw diameter is 50 mm. Second extruder 3 is a single screw extruder (L/D=25) and the screw diameter is 65 mm.

A resin mixture was fed in the first extruder from the hopper. By activating the screw of the first extruder, the resin mixture was plasticized and melted. At the same time, liquidized carbon dioxide cooled in the refrigerant circulator was fed in the barrel at the midway point of the first extruder while controlling the feed amount by the metering pump. The liquidized carbon dioxide, a foaming agent, was sufficiently dissolved in the resin mixture before the resin mixture migrates into the second extruder from the first extruder. By activating the screw of the second extruder, the molten resin composition was guided to the pressure-controlled circular die while keeping the internal pressure of the second extruder constant, extruding the molten resin composition from the die to cause foaming. In this way a foam film was obtained.

Moreover, the foam film was surface-pressed.

Figure 2:
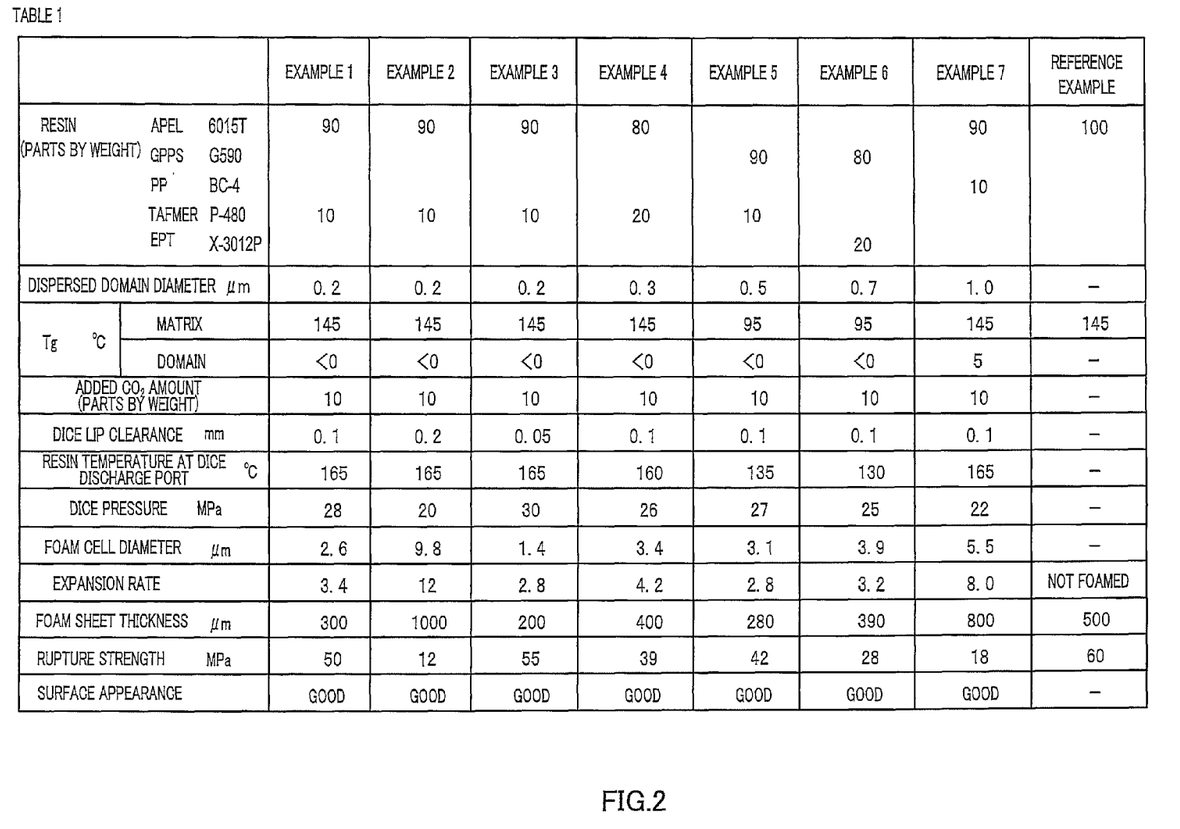
FIG. 2 is a table showing evaluations in Examples.
Figure 3:
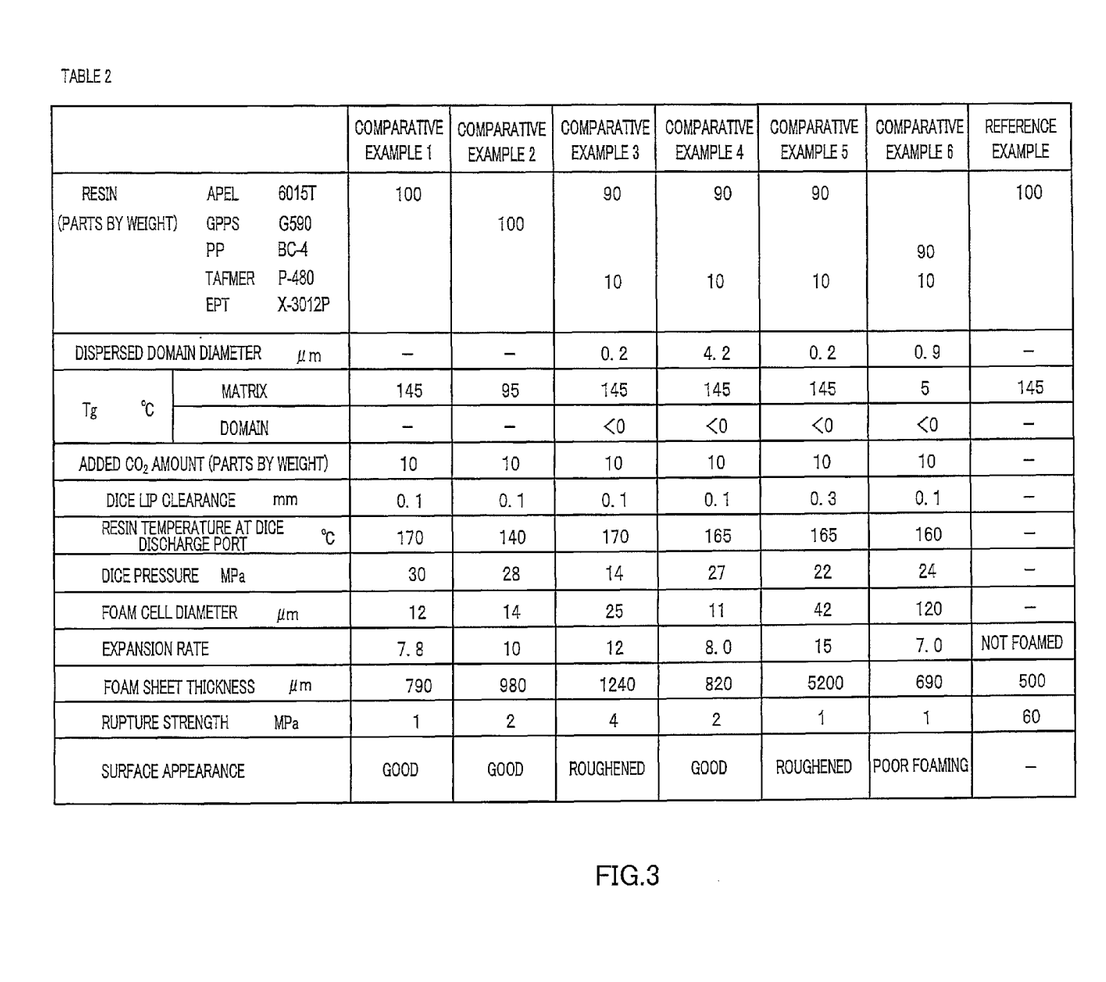
FIG. 3 is a table showing evaluations in Comparative Examples.

The kinds of used resins and their mixing ratios (by weight); amounts of dissolved carbon dioxide per 100 parts of the molten resin mixture; die lip clearances; die temperatures; die pressures; and so forth are listed in Table 1 (FIGS. 2 and 3). Resins used in Examples and Comparative Examples are as described below.

The glass transition temperatures (Tg) of each resin was defined as a temperature corresponding to an endothermic peak in its differential scanning calorimetry (DSC) curve obtained by heating the resin at a heating rate of 10° C./min using a commercially available differential scanning calorimeter. As the differential scanning calorimeter, EXSTAR DSC6220 (Seiko Instruments Inc.) was used. Mooney viscosities at 125° C. were employed which were measured in accordance with JIS K 6300-1: "How to measure viscosity and scorch time with a Mooney viscometer."

Resin A1: Cyclic polyolefin (APEL®6015T, Mitsui Chemicals Inc.)
 260° C. MFR: 7 (g/10 min.)
 Tg: 145° C.
Resin A2: Polystyrene (GPPS, G590, Japan Polystyrene Inc.)
 200° C. MFR: 3.5 (g/10 min.)
 Tg: 95° C.
Resin B1: Ethylene-propylene rubber (TAFMER® P-480, Mitsui Chemicals Inc.)
 220° C. MFR: 1.8 (g/10 min.)
 Tg: −60° C.
Resin B2: Ethylene-propylene rubber (EPT X-3012P, Mitsui Chemicals Inc.)
 125° C. Mooney viscosity: 8
 Tg: −70° C.
Polypropylene: NOVATEC-PP BC-4 (Japan Polypropylene Corporation)
 230° C. MFR: 5 (g/10 min.)
 Tg: 5° C.

Example 1

As resin (A) cyclic polyolefin (APEL®6015 T) was used, and as resin (B) ethylene-propylene rubber (TAFMER® P-480) was used. Resin (A)/resin (B) ratio was set to 90/10 (by weight). A resin mixture of resins (A) and (B) was then extruded using an intermeshing co-rotating 30 mm-diameter twin screw extruder (BT-30-S, Research Laboratory of Plastics Technology Co., Ltd.) at a discharge rate of 8 kg/h at 250° C., producing pellets of the resin mixture in which resin (B) is finely dispersed in resin (A). The pellets were subjected to extrusion foaming using a tandem extruder with the die lip clearance set to 0.1 mm and die pressure set to 28 MPa.

Example 2

Pellets of a resin mixture in which resin (B) is finely dispersed in resin (A) were produced in the same manner as in Example 1. The pellets were subjected to extrusion foaming using the tandem extruder with the die lip clearance set to 0.2 mm and die pressure set to 20 MPa.

Example 3

Pellets of a resin mixture in which resin (B) is finely dispersed in resin (A) were produced in the same manner as in Example 1. The pellets were subjected to extrusion foaming using the tandem extruder with the die lip clearance set to 0.05 mm and die pressure set to 30 MPa.

Example 4

Pellets of a resin mixture in which resin (B) is finely dispersed in resin (A) were produced in the same manner as in Example 1 except that the resin (A)/resin (B) ratio was set to 80/20 (by weight). The pellets were subject to extrusion foaming as in Example 1 except that the die temperature and die pressure were slightly changed.

Example 5

As resin (A) polystyrene (GPPS, G590) was used, and as resin (B) ethylene-propylene rubber (TAFMER® P-480) was used. Resin (A)/resin (B) ratio was set to 90/10 (by weight). A resin mixture of resins (A) and (B) was then extruded using the intermeshing co-rotating 30 mm-diameter twin screw extruder (Research Laboratory of Plastics Technology Co., Ltd.) at a discharge rate of 9 kg/h at 210° C., producing pellets of the resin mixture in which resin (B) is finely dispersed in resin (A).

Example 6

Pellets of a resin mixture in which resin (B) is finely dispersed in resin (A) were produced in the same manner as in Example 5 except that as resin (B) ethylene-propylene rubber (EPT X-3012P) was used while setting the resin (A)/resin (B) ratio to 80/20 (by weight). The pellets were subjected to extrusion foaming as in Example 5 except that the die temperature and die pressure were slightly changed.

Example 7

Pellets of a resin mixture in which resin (B) is finely dispersed in resin (A) were produced in the same manner as in Example 1 except that as resin (B) polypropylene (PP BC-4) was used. The pellets were subjected to extrusion foaming as in Example 1 except that the die pressure was slightly changed.

Comparative Examples 1 and 2

In Comparative Example 1 cyclic polyolefin (APEL® 6015T) was used alone, and in Comparative Example 2 polystyrene (GPPS, G590) was used alone. Extrusion foaming was conducted under the same condition as in Examples except that the die pressure and die temperature were slightly changed.

Comparative Example 3

Extrusion foaming was conducted under the same condition as in Example 1 except that the die pressure was reduced from 28 MPa to 14 MPa and that the die temperature was slightly changed.

Comparative Example 4

Pellets of a resin mixture of resins (A) and (B) mixed in the same ratio as in Example 1 were manually blended as they are rather than being kneaded with a twin screw extruder. The resultant mixture is directly fed in the extruder to produce a resin composition in which the diameters of dispersed particles, i.e., diameters of dispersed resin (B) particles (dispersed domain diameters) are large (4.2 μm as opposed to 0.2 μm in Examples). The resin composition was subjected to extrusion foaming as in Example 1 except that the die pressure and die temperature were slightly changed.

Comparative Example 5

A resin composition similar to that prepared in Example 1 was subjected to extrusion foaming under the same condition as in Example 1 except that the die lip clearance was made large (0.3 mm as opposed to 0.1 mm in Example 1) and that the die pressure and die temperature were slightly changed.

Comparative Example 6

As resin (A) polypropylene (PP BC-4) was used, and as resin (B) ethylene-propylene rubber (TAFMER® P-480) was used. Resin (A)/resin (B) ratio was set to 90/10 (by weight). Extrusion foaming was conducted under the same condition as in Example 1 except that the die pressure and die temperature were slightly changed.

Reference Example

A unfoamed sheet of cyclic polyolefin (APEL®6015T) was prepared.

Table 1 (see FIG. 2) and Table 2 (see FIG. 3) list physical properties of resultant foams—foam cell diameter, expansion ratio, foam thickness, and rupture strength. Foam cell diameter and foam thickness were measured according to the above-described procedures. Rupture strength was defined as a stress measured as follows: A resultant foam sheet is cut in a piece (10 mm×100 mm), and a stress at which the cut sheet piece ruptures is measured at 23° C. using a commercial tensile tester. Upon measurement, chuck-to-chuck distance was set to 50 mm, and head speed was set to 500 mm/min.

All of the foams prepared in Examples 1-7 had foam cell diameters (diameters of fine foam cell-containing resin (B) particles) of not greater than 10 μm. The foams prepared in Examples 1 and 3-6 had foam cell diameters of not greater than 4 μm. By contrast, foams prepared in Comparative Example 1 where only resin (A) was used and Comparative Example 2 had foam cell diameters of greater than 10 μm. Moreover, foam cell diameters in Comparative Examples 3-6 where the same resins as those in Examples were used were also greater than 10 μm. The foams prepared in Examples 1-7 had higher rupture strengths than those prepared in Comparative Examples 1-6.

These results suggest that foam cells can be made fine by foaming a resin composition, which contains resins (A) and (B) having appropriately selected glass transition temperatures, while appropriately selecting the die pressure, die lip clearance, etc., of an extruder.

INDUSTRIAL APPLICABILITY

A foam according to an embodiment of the present invention is cost effective as it is produced by continuous extrusion. The present invention has succeeded in overcoming the problem of reduced mechanical strength due to the presence of bubbles, a drawback associated with conventional foams. Thus, a foam can be provided in which mechanical strength is ensured. In addition, the foam can be used as a light reflective material because its foam cells are made fine and foam cell density is enhanced.

REFERENCE SIGNS LIST

1: First extruder
2: Connecting pipe
3: Second extruder
4: Pressure-controlled circular die
5: Foam
6: Hopper
7: Mixer
8: Resin
9: Foaming agent feed unit
10: Direct mass flow meter
11: Pressure valve
12: Foaming agent metering pump
13: Refrigerant circulator
14: Foaming agent tank

The invention claimed is:

1. A method of producing a foam comprising:
preparing a molten resin composition which contains resin (A) having a glass transition temperature of higher than 50° C., particulate resin (B) immiscibly dispersed in resin (A), resin (B) having a glass transition temperature of lower than the glass transition temperature of resin (A) by 50° C. or more, and a foaming agent; and
producing a foam by continuous extrusion foaming of the molten resin composition with an extruder equipped with a circular die, an internal pressure and a lip clearance of the circular die being 20 MPa or higher and 0.2 mm or less, respectively,
wherein, during the continuous extrusion foaming, the foaming agent is allowed to foam in particulate resin (B) to form bubbles in the particulate resin (B) and wherein the particulate resin (B) in which bubbles are formed has a particle diameter of 10 μm or less,
wherein the foam has a rupture strength of 12 MPa to 55 MPa when measured at 23° C., and
wherein resin (A) is cyclic polyolefin resin, and resin (B) is polypropylene resin, polyethylene resin, or elastomer.

2. The method according to claim 1, wherein resin (B) has an average particle diameter of 1 μm or less.

3. The method according to claim 1, wherein the foaming agent is a supercritical physical foaming agent. Zone Name: OCRZone 4. The method according to claim 1, wherein the foam is a resin sheet or resin film which is 1 mm or less in thickness.

5. The method according to claim 1, wherein particulate resin (B) containing bubbles has an average diameter of 0.1 μm or more to 10 μm or less and a foam cell density of $1\times10^8$ cells/cm$^3$ or more to $1\times10^{16}$ cells/cm$^3$ or less.

6. The method according to claim 2, wherein particulate resin (B) containing bubbles has an average diameter of 0.1 µm or more to 10 µm or less and a foam cell density is $1\times10^8$ cells/cm$^3$ or more to $1\times10^{16}$ cells/cm$^3$ or less.

7. The method according to claim 1, wherein resin (B) is ethylene-propylene rubber.

* * * * *